US009224204B2

(12) United States Patent
Vija

(10) Patent No.: US 9,224,204 B2
(45) Date of Patent: Dec. 29, 2015

(54) METHOD AND APPARATUS FOR REGISTRATION OF MULTIMODAL IMAGING DATA USING CONSTRAINTS

(71) Applicant: Siemens Medical Solutions USA, Inc., Malvern, PA (US)

(72) Inventor: Alexander Hans Vija, Evanston, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 86 days.

(21) Appl. No.: 14/207,694

(22) Filed: Mar. 13, 2014

(65) Prior Publication Data
US 2014/0270446 A1 Sep. 18, 2014

Related U.S. Application Data

(60) Provisional application No. 61/787,943, filed on Mar. 15, 2013.

(51) Int. Cl.
*G06K 9/00* (2006.01)
*G06T 7/00* (2006.01)
*A61B 6/00* (2006.01)

(52) U.S. Cl.
CPC ....... *G06T 7/003* (2013.01); *G06T 2207/10081* (2013.01); *G06T 2207/10104* (2013.01); *G06T 2207/20221* (2013.01); *G06T 2207/30008* (2013.01)

(58) Field of Classification Search
CPC .................................. G06K 9/00; G06T 7/00
USPC .............. 382/128–134; 378/4, 8, 21–27, 101, 378/901; 600/407, 410, 41, 425, 427
See application file for complete search history.

(56) References Cited

U.S. PATENT DOCUMENTS

| | | | |
|---|---|---|---|
| 6,950,494 B2* | 9/2005 | Vija | A61B 6/505 378/4 |
| 7,496,217 B2* | 2/2009 | Tank | 382/128 |
| 8,577,103 B2 | 11/2013 | Vija et al. | |
| 2010/0286555 A1* | 11/2010 | Crosby et al. | 600/562 |
| 2013/0267841 A1 | 10/2013 | Vija | |

OTHER PUBLICATIONS

Bharatha, A., Hirose M., et al. "Evaluation of three-dimensional finite element-based deformable registration of pre-and intra-operative prostate imaging", Med. Phys. 28 (12), Dec. 2001, pp. 2551-2560.
Papademetris, X., et al. "Recovery of Soft Tissue Object Deformation from 3D Image Sequences using Biomedical Models", Information Processing in Medical Imaging, Springer, Lect. Notes in Computer Science, Jun. 1999, pp. 352-357.

(Continued)

*Primary Examiner* — Abolfazl Tabatabai
(74) *Attorney, Agent, or Firm* — Peter Kendall

(57) ABSTRACT

First and second images obtained from first and second imaging modalities, respectively, are set as a target image and an object image, respectively. The object image is segmented into one or more anatomic segments. Each segment is associated with a respective anatomic class. At least one attribute is assigned to at least one of the anatomic segments based on the anatomic class corresponding to said at least one anatomic segment. A registration is performed with the object image and the target image, wherein the registration is constrained by the assigned attribute(s).

20 Claims, 4 Drawing Sheets

(56) References Cited

OTHER PUBLICATIONS

Maintz et al., "A Survey of Medical Imaging Registration", Medical Image Analysis, 1998, v2, pp. 1-36.
Yu, D.F., and Fessler, J.A., "Edge-Preserving Tomographic Reconstruction with Nonlocal Regularization", IEEE Transactions on Medical Imaging, vol. 21, No. 2, Feb. 2002, pp. 159-173.
Metaxas, Dimitris N., Physics-Based Deformable Models: Applications to Computer Vision, Graphics, and Medical Imaging, 1st edition, Chapter 2 (pp. 17-25), and Chapter 7 (pp. 77-86).
Zubal, I.G. et al, "Computerized three-dimensional segmented human anatomy", Med. Phys. 21( 2), Feb. 1994, pp. 299-302.
Greene, W. H. et al. "A Constrained Non-Rigid Registration Algorithm for Application in Prostate Radiotherapy," Biomedical Imaging: From Nano to Macro, 2007. ISBI 2007. 4th IEEE International Symposium on Biomedical Imaging, Apr. 2007, pp. 740-743.
Koçak, Umt et al. "A framework for soft tissue deformation", in Proceedings of SIGRAD Conference 2009.
Andresen, P.R., Nielsen M., "Non-rigid registration by geometry-constrained diffusion", Med Image Anal. 5, 2001, pp. 81-88.
Duan, Yuping et al., "Modeling and Simulation of Soft Tissue Deformation", Abdominal Imaging: Computation and Clinical Applications, Lecture Notes in Computer Science, vol. 8198, 2013, pp. 221-230.

\* cited by examiner

METHOD AND APPARATUS FOR REGISTRATION OF MULTIMODAL IMAGING DATA USING CONSTRAINTS

CROSS-REFERENCE TO RELATED APPLICATION

This application claims priority under 35 U.S.C. §119(e) from U.S. Provisional Application Ser. No. 61/787,943 filed Mar. 15, 2013, the entirety of which is hereby incorporated by reference herein.

FIELD

Aspects of the present disclosure relate in general to processing of image data (e.g., multi-modal medical imaging data), and more particularly to elastic registration of multimodal imaging data using constraints.

BACKGROUND

Medical imaging can be performed with a variety of imaging modalities, e.g., computed tomography (CT), magnetic resonance (MR), single photon emission computed tomography (SPECT), positron emission tomography (PET), ultrasonographic (US), etc. Each type of imaging involves measuring some property or function of the patient, and forming images (e.g., 2D, 3D, or 4D images) that can be used by a trained expert to extract relevant medical information. The amalgamation of information from various modalities holds the promise of a synergistic effect. Overlaying images obtained from two different modalities and viewing them together offers additional benefits for analyzing the images for medical diagnosis. The overlaying of two images from two different modalities involves registering the two images so they are properly aligned.

The process of image registration involves relating a property or function measured with an imaging modality at a spatio-temporal location to a common coordinate system. Such a common coordinate system could either be defined by data of another imaging modality, by the system's reference coordinates, or arbitrarily by the user. Registration is of interest in multimodality imaging for applications in diagnostic imaging and image guided therapy planning, execution, and monitoring. For example, consider a scenario in which a first image obtained via CT shows a patient's bones in the rib cage, and a second image obtained via magnetic resonance (MR) shows the patient's heart. If the images can be referenced to a common coordinate system, then it is possible to manipulate one of the images so that an overlay or composite image reveals the bones as well as the heart.

Registration methods essentially involve determining transformations for achieving a best fit for an image of one modality, the object image, onto an image of another modality, the reference or target image. As such, an optimization problem is typically set up and solved, e.g., a minimization of a distance measured between the target image and the object image, under one or more constraints. Typically, the target image is fixed, and the object image is varied subject to the constraints for the optimization. Image registration is described in greater detail in Maintz et al., "A Survey of Medical Imaging Registration," Medical Image Analysis, 1998, v2, the entirety of which is hereby incorporated by reference herein.

In rigid registrations the assumption is made that the objects or components present in the images (e.g., in the object image) are ideal solids behaving as rigid bodies, such that only congruent rotation and translation operations are allowed. This imposes the most stringent constraints on the minimization, and such constraints are often needed to even arrive at a reasonable solution, as the data are often not only noisy, but also represent different material properties or functions probed by the different modalities. A drawback of using only rigid registration is that while it may yield good results for bones, the results may be poor for soft tissues that do not physically behave as rigid bodies.

In order to accomplish registration of soft tissue images, non-rigid registration methods allowing for elastic deformation have previously been developed. By incorporating elastic deformation, motions or transformations of objects are allowed as part of the optimization process. These motions or transformations of objects include not only rotations and translations, but also stretching, compression, and shearing. However, the existing non-rigid registration methods typically lead to undesirable artifacts such as elongated or otherwise distorted bones, rather than deformed soft tissues. Non-rigid deformable registration and deformable models are described in more detail in Bharatha et al., "Evaluation of three-dimensional finite element-based deformable registration of pre- and intra-operative prostate imaging," Med. Phys. 28(12), 2001 and Metaxas, D. N., *Physics-Based Deformable Models: Applications to Computer Vision, Graphics, and Medical Imaging*, $1^{st}$ edition, which references are hereby incorporated by reference herein in their entireties.

SUMMARY

In some embodiments of the present disclosure, first and second images obtained from first and second imaging modalities, respectively, are set as a target image and an object image, respectively. The object image is segmented into one or more anatomic segments. Each segment is associated with a respective anatomic class. At least one attribute is assigned to at least one of the anatomic segments based on the anatomic class corresponding to said at least one anatomic segment. A registration is performed with the object image and the target image, wherein the registration is constrained by the assigned attribute(s).

In some embodiments, a non-transitory computer readable medium has instructions embodied tangibly thereupon. The instructions, when executed, are configured to cause one or more processors to perform various operations. A first image and a second image obtained from first and second imaging modalities, respectively, are set as a target image and an object image, respectively. The object image is segmented into one or more anatomic segments, each segment associated with a respective anatomic class. At least one attribute is assigned to at least one of the anatomic segments based on the anatomic class corresponding to said at least one anatomic segment. A registration is performed with the object image and the target image, wherein the registration is constrained by the assigned attribute(s).

In some embodiments, first and second images obtained from first and second imaging modalities, respectively, are set as a target image and an object image, respectively. The object image is segmented into one or more anatomic segments. At least one attribute is assigned to at least one of the anatomic segments based on anatomic information associated with said at least one anatomic segment. A registration is performed with the object image and the target image, wherein the registration is constrained by the assigned attributes.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

Various embodiments of the present disclosure provide more realistic, accurate deformable registration of multimodal medical imaging data than has been previously possible. Specifically, by deriving those constraints from anatomic information and imposing those constraints on the optimization process of registration, various embodiments enable registrations that reduce or eliminate the risk of deforming solid objects (e.g., bones). Various embodiments also restrict the motion of tissues for image registration to anatomically correct, physically realizable motions. The resulting registrations have decreased prevalence of anatomically suspicious deformations. Consequently, physicians and other users of medical imaging data will have increased confidence in the accuracy and viability of the registration results, and there is reduced propagation of errors for downstream processing that uses the registered data.

Figure 1:
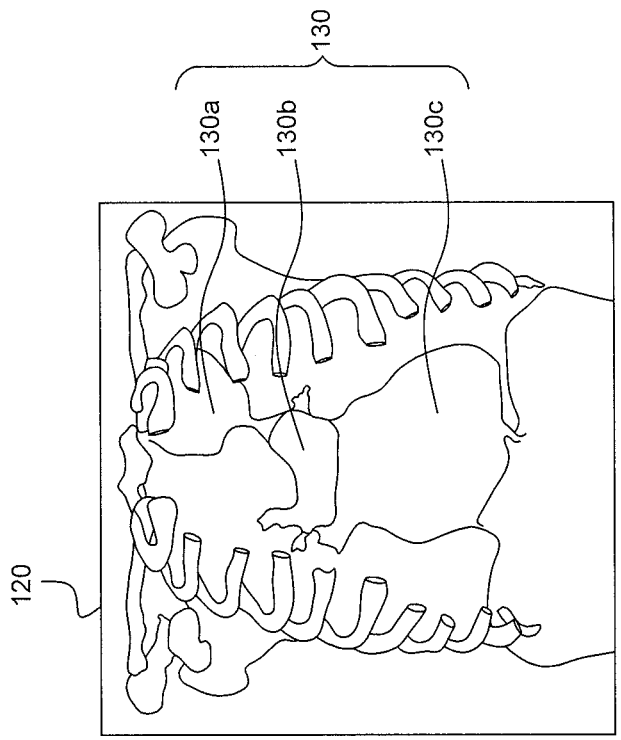
FIG. 1 is a depiction of a pair of medical images from different imaging modalities.
Figure 1:
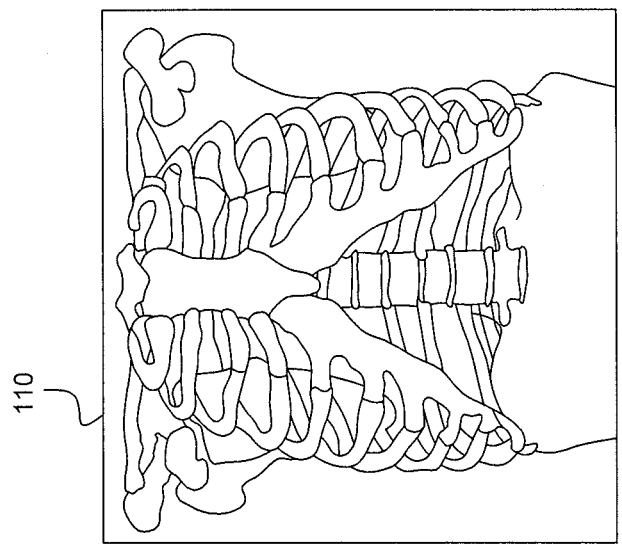

FIG. 1 is a depiction of a pair of medical images from different imaging modalities. Image 110 is obtained from a first imaging modality, and image 120 is obtained from a second imaging modality. Any pair of different imaging modalities may be used. Common imaging modalities that may be used include, but are not limited to, computed tomography (CT), magnetic resonance (MR), single photon emission computed tomography (SPECT), positron emission tomography (PET), and ultrasonographic (US) imaging. Images 110 and 120 may be reconstructed 3D images that are each computed from multiple 2D image slices. Each reconstructed 3D image 110, 120 includes multiple voxels, and each image slice used to reconstruct the 3D images includes multiple pixels. The images 110, 120 may be of any portion of a patient's body. In this example, images 110 and 120 are CT and MRI images, respectively, of a patient's thoracic region. Typically, images obtained from different modalities correspond to different times.

Figure 2:
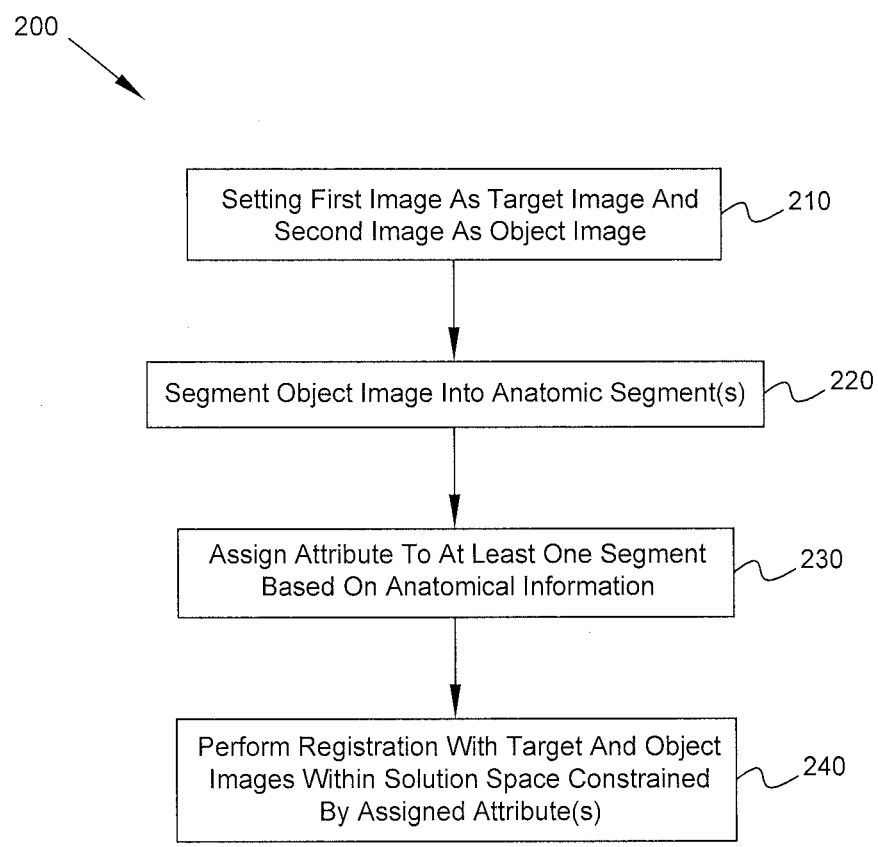
FIG. 2 is a flow diagram of a process for image registration in accordance with some embodiments of the present disclosure.

FIG. 2 is a flow diagram of a process 200 in accordance with some embodiments of the present disclosure. At block 210, one of the images (e.g., image 110) is set as the target image and the other image (e.g., image 120) is set as the object image. The object image is segmented (block 220) into one or more anatomic segments (e.g., segments 130a, 130b, 130c in FIG. 1, collectively segments 130). The segments may be at the per-pixel or per-voxel level or may be sets of pixels or voxels. The segments may include any type of anatomic structure, e.g., soft tissues such as tendons, ligaments, nerves, or bones, lungs, heart, etc. The segments may be classified into anatomic classes using any segmentation technique, e.g., as described in U.S. Patent Pub. No. 2013/0267841 to Vija entitled "Extracting application dependent extra modal information from an anatomical imaging modality for use in reconstruction of functional imaging data," the entire contents of which are hereby incorporated by reference herein.

This segmentation and classification may be performed automatically, manually, or semi-automatically. For example, all the bones (if present in the image) may be classified in one class, the lungs (if present in the image) may be in another class, etc.

An attribute is assigned to at least one of the anatomic segments 130 based on anatomic information associated with those segments. The attribute may pertain to a kinematical, dynamical, or material property of the corresponding anatomic structure (e.g., elasticity, stress). The attribute may be represented in any convenient physical or mathematical representation, e.g., as a tensor quantity. As one of ordinary skill in the art knows, a tensor is a mathematical or geometrical object that includes a collection of numerical value(s) for describing the physical state or properties of a material. For example, a vector is a first order tensor, and a matrix having rows and columns (e.g., corresponding to a linear transformation) is a second order tensor.

At block 240, registration is performed with the object image and the target image within a solution space constrained by the assigned attribute(s). The registration may include optimizing a transformation of a data set of the object image (e.g., call it data set X) representing a configuration state of the anatomy of the patient at a measurement time $t_0$ to a data set Y at a time $t_1$. The transformation may include matrix multiplications that transform vectors in the object image to vectors in the target image. The attribute(s) assigned to respective segments 130 are used to model the kinematics and dynamics of various tissues for the optimization. For example, the elasticity of a segment 130 may be used to constrain the space of possible shearings (or compressions) that are applied to a soft tissue as part of a the optimization. In this way, a segment that is identified as a bone may be constrained to rotations and translations, and a segment that is identified as a soft tissue may be allowed to shear but only in ways that are appropriate to that type of soft tissue or even that particular instance of soft tissue.

The registration may be implemented in various ways. For example, the registration may use any of the techniques described at the Maintz et al. reference (see citation above). In some embodiments of the present disclosure, registration is cast as an optimization task such as minimization of an objective function (or maximization, depending on how the objective function is defined) with anatomically based constraints regarding the possible deformation and rigid-body displacement of individual pixels (or sets of pixels) in the object image. The minimization can be implemented with penalized weighted least squares techniques with nonlocal regularizations, e.g., as described at Yu et al., "Edge-preserving tomographic reconstruction with nonlocal registration," *Medical Imaging*, IEEE TNS, 21 (2), 2002, pp. 159-173, the entirety of which is hereby incorporated by reference herein.

In various embodiments, the constraints for the optimization are derived from material properties (e.g., elasticity tensors) of anatomic structures, and they may be assigned automatically, manually (e.g., by a human observer or operator), or semi-automatically. In one embodiment, CT pixel or voxel values are converted to elasticity tensors. The CT pixel or voxel values may be directly converted to elasticity tensors using a preconfigured look-up table or similar mapping. Alternatively, in an indirect conversion approach, the CT data may be first converted to linear attenuation coefficients and then converted to elasticity tensors. Conversion of CT pixel values to linear attenuation coefficients is described in U.S. Pat. No. 6,950,494 to Vija et al., the entirety of which is hereby incorporated by reference herein. A μ-map (mu-map), which maps attenuations to elasticity tensors (e.g., with a lookup table), may be used for the indirect conversion approach.

In addition to assisting with segmentation and/or assignment of material properties, a human observer may also provide assistance or inputs regarding directional restriction to significant pixels or voxels. For example, certain pixels or voxels may be isolated as insignificant and handled differently for the optimization, e.g., by limiting the maximum rotation or maximum shift that can be used during registration. For example, non-physical motions such as a wrist rotation of greater than 360 degrees can be prohibited in this manner.

Figure 3:
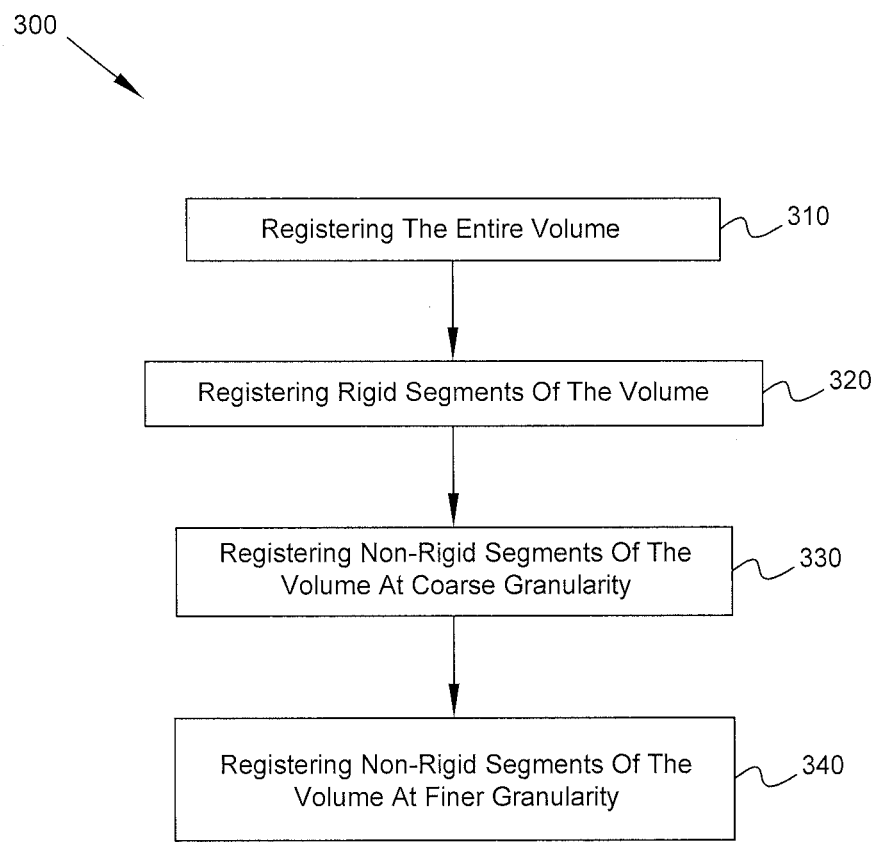
FIG. 3 is an illustration of an iterative process for image registration in accordance with some embodiments.

Referring to FIG. 3, in some embodiments, an iterative procedure is used for image registration. Registration may first be performed for the entire volume (block 310) corresponding to the object image, to provide a baseline that can be refined with subsequent processing. A set of sample voxels corresponding to the reconstructed object image may be selected. The sample voxels in the set are segmented and linked to attributes such as elasticity or stress tensors. A connected graph or network of rigid tissues (similar to a stick man) may thus be created. This connected graph or network may then be simplified to a group of rigid lines connected to one another at intersections that may be considered to be anatomic joints. The rigid segments may be registered (block 320). In a similar manner, a soft tissue network and a lung network may also be formed, and the non-rigid segments may be registered (block 330). Additional sets of sample voxels may be processed in a similar manner, until all the voxels are mapped to attributes and the registration data sets (target and object) are consistent with each other. In some embodiments, registration of non-rigid segments is performed first at a relatively coarse granularity and then at a finer granularity (block 340), e.g., using smaller, more numerous voxels. Any number of iterations with increasingly fine granularity may be used.

Thus, in some embodiments, an initial rigid registration is performed for bone segments, e.g., based on the simplified group of rigid lines described above. Then, non-rigid registration is performed for at least one soft tissue segment based on a motion of one of the bone segments determined by the rigid registration. One example implementation of soft tissue registration includes creating a tesselation (e.g., a Delaunay tesselation) of soft tissue(s) based on boundaries resulting from segmentation. A Voronoi diagram can be formed and used to determine control points corresponding to respective polygons in the tesselation. The control points define a network that can be processed in a computationally efficient manner, and constraints can be applied.

In some embodiments, motion-related characteristics such as a possible direction of motion and warping for one or more pixels or voxels are derived from an assigned attribute (e.g., elasticity tensor). Additionally or alternatively, local elasticity tensors (elasticity tensors corresponding not to an entire volume of a soft tissue but rather to a volume of interest comprising one or more voxels) can be computed from known motion of anatomic structures. A motion calibration device can be used for this purpose. For example, a physician or other human assisting the patient can lift the patient's arm and measure or track the arm's motion with a tracking device, or the patient's breathing can be monitored by a stereoscopic device.

In some embodiments, the assignment of elasticity tensors to anatomic segments is performed automatically, e.g., using techniques described at Papademetris et al., "Recovery of Soft Tissue Object Deformation from 3D Image Sequences Using Biomedical Models," Information Processing in Medical Imaging, Springer, Lect. Notes in Computer Science, June 1999, the entirety of which is herein incorporated by reference. An elasticity tensor map, mapping anatomic structures to elasticity tensors, may be prepared in various ways. In some embodiments, a "model man" approach is used. The model man is analogous to a human model (e.g., derived from the Zubal Phantom described at Zubal et al., "Computerized 3-Dimensional Segmented Human Anatomy," *Med. Phys.* 21(2): 299-302, 1994) wherein various tissues of the human body are assigned average elasticity tensors.

In some embodiments, an initial rough estimate of attributes (e.g., elasticity tensors) for respective tissues is assigned (e.g., manually or automatically), and the attributes are subsequently refined. For example, one or more elasticity tensors can be updated based on local elasticity computations (described above) or patient-specific calibration. Such calibration can be performed by mechanically perturbing one or more tissues, according to a material property parameter and assigned attribute(s), and then analyzing the response obtained. For example, a perturbation may be based on a material property parameter such as linear attenuation coefficient, proton density, maximum uptake time, or any other material property parameter. Such a material property parameter may be used to assign a tissue type, attribute, or class to segment in an image, e.g., using a lookup table. Perturbation analysis can be performed in various ways, e.g., by using force sensors, fiducial markers (objects introduced into the field of view of the imaging to serve as a reference marker), or dynamic imaging that includes change over time.

In some embodiments, the target image is obtained via a functional imaging modality, and the object image is obtained via an anatomical (structural) imaging modality. One of ordinary skill in the art understands that functional imaging and anatomical imaging are different approaches for forming medical images. Anatomical imaging (also known as structural imaging) includes techniques such as CT (including CT contrast imaging), MR (including MR contrast imaging), and ultrasound (US) imaging (including US elastosonography). Functional imaging, which includes techniques such as SPECT, PET, and fMRI, focuses on identifying physiological activities within the body, e.g., using tracers or probes to ascertain spatial distribution and using variation in time in contrast to the relatively static approach of anatomic imaging. In 3D images obtained via functional imaging, each voxel typically represents a count, and higher counts may be represented as higher intensities. The dynamic (time-varying) nature of functional imaging presents certain challenges. For example, suppose functional imaging reveals that a voxel corresponding to a part of the heart increases in intensity and then decreases in intensity, followed by a voxel at the liver increasing and then decreasing in intensity, and followed by a voxel at the bladder increasing and then decreasing in intensity. Such imaging results, which may correspond to a tracer flowing from the heart to the liver and then the bladder, typically reveal a variety of information over time but are relatively difficult to analyze (and, for example, segment/classify) at a single snapshot (instant in time).

At least three approaches may be used for segmentation of images obtained via functional imaging. A human may manually perform the segmentation and/or classification tasks, e.g., based on expert knowledge. Another approach is to use a machine learning or template-based matching algorithm to automatically segment an image and/or classify image segments using a computer. Yet another approach is to observe the intensity variation over time (e.g., at respective voxels) and automatically perform segmentation based on a dynamic property. For example, in the above example, the relative uptake of a tracer in the heart, liver and bladder may be observed. Because intensity is expected to first rise in a heart voxel, then in a liver voxel, and later in a bladder voxel, these respective anatomic parts may be segmented and classified based on the observed variation in intensity at respective voxels over time.

In a scenario where the target and object images are obtained via 3D functional and 3D structural imaging modalities, respectively, it may be difficult with traditional techniques to distinguish between motion (a patient keeping her elbow fixed and moving her forearm during the imaging process) and deformations of the object image associated with the registration process if the acquisition times of the two modalities are very different, e.g., SPECT functional imaging with an acquisition time $T_{functional}$ on the order of tens of minutes and CT structural imaging with an acquisition time $T_{structural}$ on the order of tens of seconds. In such a scenario, the motion during the SPECT will cause blurred projection data, resulting in a blurry or even artifacted image of the body part that moved in the field of view. In other words, in such a scenario, $T_{functional} \gg T_{structural}$ and $T_{motion} > T_{structural}$, resulting in blurring in the functional imaging but not in the structural imaging. A deformable registration may then fail, as the mathematically best solution is likely not anatomically possible. In some embodiments of the present disclosure, this challenge is addressed by using a single structural image to create multiple virtual images spanning the trajectory of the patient's arm, consistent with the material properties constraining the solution. For example, a single CT image may be used to create five virtual CT images, with one of the virtual images being at one endpoint of the forearm's trajectory, another virtual image being at another endpoint, and other virtual images being at intermediate points in the trajectory. Each virtual image may be registered with the functionally-derived image, e.g., using constraint-based registration based on material attribute(s). The resulting registered virtual images may be summed to yield a blurred image revealing motion of the forearm. By performing registration for each virtual image (e.g., for each of the five time points along the trajectory), an accurate reference is determined and maintained at each stage, enabling the summed image to be meaningful.

Thus, in the scenario where $T_{functional} \gg T_{structural}$ and $T_{motion} > T_{structural}$, the technique of deformable registration with biomedical constraints (DRBMC) is used with an additional degree of freedom to allow for motion during the DRBMC and with virtualization of the structural image data, to properly account for the motion.

Consider another scenario in which $T_{functional}$ is equal to (or at least approximately equal to) $T_{structural}$ (e.g., for MR structural imaging). In this scenario, DRBMC does not need an additional degree of freedom to allow for motion, because both imaging modalities have equal or comparable acquisition times and thus "see" the same motion, even if $T_{motion} < T_{functional}$.

In some embodiments involving a functional modality for the target image and a structural modality for the object image, dynamic 3D or 4D SPECT (or temporal tomographic consistent SPECT) is used for the functional modality. Suppose 3D functional imaging and 4D structural imaging are used for the target and object images, respectively. If $T_{functional} \gg T_{structural}$ and motion is present with $T_{motion} > T_{structural}$, then blurring may be present in the functional images but not in the structural images. In such a scenario, multiple actual (as opposed to virtual) structural images (e.g., actual CT images) may be registered with the dynamic 3D or 4D SPECT image. Although blurring would result, the motion may compensated out, e.g., using deconvolution. Thus, DRBMC with an additional degree of freedom to allow for motion handles this case.

In some embodiments where 4D functional and 4D structural imaging are used for the target and object images, respectively, motion is already available in the image data. In such a scenario, registration defaults back to the approach for 3D deformation with constraints and no motion, with registration performed at each time point or time interval.

Figure 4:
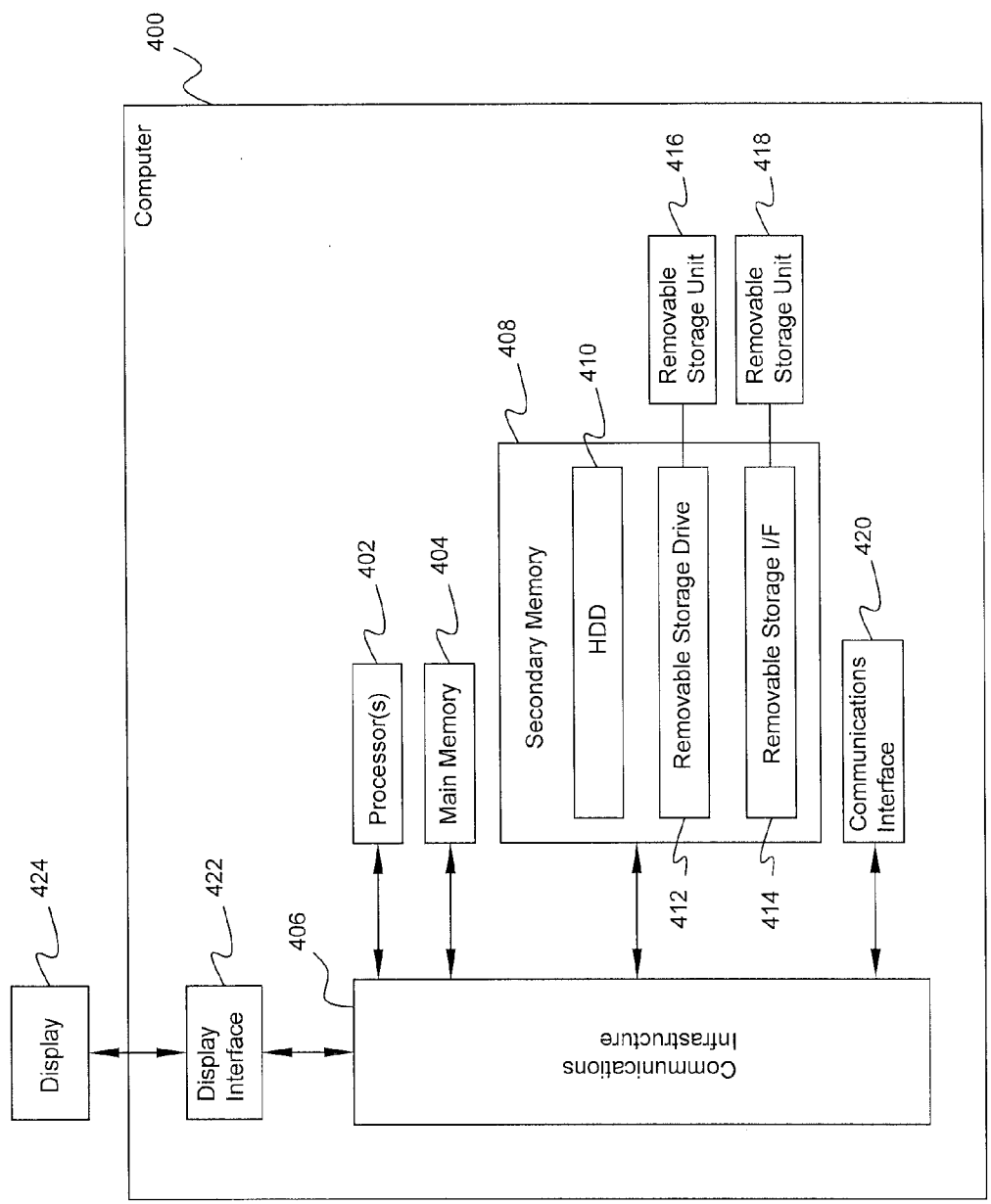
FIG. 4 is an architecture diagram of a computer system 400 that may be used in some embodiments.

FIG. 4 is an architecture diagram of a computer system 400 that may be used in some embodiments. Computer system may be used for image generation (with any one or more of various imaging modalities), segmentation, assignment of attributes to segments, registration (including associated optimization tasks), and/or other operations, either automatically or with manual input(s). Computer system 400 may include one or more processors 402. Each processor 402 is connected to a communication infrastructure 406 (e.g., a communications bus, cross-over bar, or network). Computer system 400 may include a display interface 422 that forwards graphics, text, and other data from the communication infrastructure 406 (or from a frame buffer, not shown) for display on the display unit 424.

Computer system 400 may also include a main memory 404, such as a random access memory (RAM), and a secondary memory 408. The secondary memory 408 may include, for example, a hard disk drive (HDD) 410 and/or removable storage drive 412, which may represent a floppy disk drive, a magnetic tape drive, an optical disk drive, a memory stick, or the like as is known in the art. The removable storage drive 412 reads from and/or writes to a removable storage unit 416. Removable storage unit 416 may be a floppy disk, magnetic tape, optical disk, or the like. As will be understood, the removable storage unit 416 may include a computer readable storage medium having tangibly stored therein (embodied thereon) data and/or computer software instructions, e.g., for causing the processor(s) to perform various operations.

In alternative embodiments, secondary memory 408 may include other similar devices for allowing computer programs or other instructions to be loaded into computer system 400. Secondary memory 408 may include a removable storage unit 418 and a corresponding removable storage interface 414, which may be similar to removable storage drive 412, with its own removable storage unit 416. Examples of such removable storage units include, but are not limited to, USB or flash drives, which allow software and data to be transferred from the removable storage unit 416, 418 to computer system 400.

Computer system 400 may also include a communications interface 420. Communications interface 420 allows software and data to be transferred between computer system 400 and external devices. Examples of communications interface 420 may include a modem, Ethernet card, wireless network card, a Personal Computer Memory Card International Association (PCMCIA) slot and card, or the like. Software and data transferred via communications interface 420 may be in the form of signals, which may be electronic, electromagnetic, optical, or the like that are capable of being received by communications interface 420. These signals may be provided to communications interface 420 via a communications path (e.g., channel), which may be implemented using wire, cable, fiber optics, a telephone line, a cellular link, a radio frequency (RF) link and other communication channels.

In this document, the terms "computer program medium" and "non-transitory computer-readable storage medium" refer to media such as, but not limited to, media at removable storage drive 412, or a hard disk installed in hard disk drive 410, or removable storage unit 416. These computer program products provide software to computer system 400. Computer programs (also referred to as computer control logic) may be stored in main memory 404 and/or secondary memory 408. Computer programs may also be received via communications interface 420. Such computer programs, when executed by a processor, enable the computer system 400 to perform the features of the methods discussed herein. For example, main memory 404, secondary memory 408, or removable storage units 416 or 418 may be encoded with computer program code (instructions) for performing operations corresponding to various processes disclosed herein.

Embodiments of the present disclosure can be used in various applications and contexts. For example, image reconstruction with motion degrees of freedom can be performed with restrictions corresponding to biomechanical constraints, thereby enabling registration solutions to be restricted to realistic, anatomically possible patient motions, organ motions, and/or respiratory motions. The reconstruction of a functional modality can be fine-tuned and more finely registered. For example, a rigid registration can initially be performed. Then, registration can be performed for non-rigid segments (including possibly multiple iterations at increasingly fine granularity), and reconstruction can be performed again. The output of such reconstruction can then be used as an input for another registration.

Various embodiments can be used for registration of anatomical images after reconstruction. Using image registration in accordance with various embodiments, multi-modal fusion showing biomechanical constraints on functional imaging can be achieved. Such fusion can advantageously show elastic properties of tissue(s), including normal and/or abnormal elastic properties.

Multi-modal reconstruction (MMR) is dependent on the accuracy of image registration. The zones in a multi-zone MMR can be chosen according to the elastic attributes of a tissue (e.g., as assigned or computed by various embodiments of the present disclosure) and can assist in MMR. MMR is described in detail in U.S. Pat. No. 8,577,103 to Vija et al., the entirety of which is hereby incorporated by reference herein.

It is understood by those familiar with the art that the system described herein may be implemented in hardware, firmware, or software encoded (e.g., as instructions executable by a processor) on a non-transitory computer-readable storage medium.

The systems and processes are not limited to the specific embodiments described herein. In addition, components of each system and each process can be practiced independent and separate from other components and processes described herein.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Although various embodiments are described above in the context of medical imaging of a patient's body, the techniques are applicable to any context in which attributes are assignable to image segments. For example, multimodal image registration can also be used for imaging underground natural or artificial structures. The present disclosure is not intended to be limited to the embodiments shown herein, but is to be accorded the widest scope consistent with the principles and novel features disclosed herein.

What is claimed is:

1. A method for registering images obtained in a multi-modal medical imaging system, the method comprising:

setting a first image as a target image and setting a second image as an object image, wherein the first and second images are obtained from first and second imaging modalities, respectively;

segmenting the object image into one or more anatomic segments, each segment associated with a respective anatomic class;

assigning at least one attribute to at least one of the anatomic segments based on the anatomic class corresponding to said at least one anatomic segment; and using a computer of the multi-modal medical imaging system, performing a registration with the object image and the target image, wherein the registration is constrained by the assigned at least one attribute.

2. The method of claim 1, wherein performing the registration includes applying an elastic deformation.

3. The method of claim 2, wherein performing the registration includes applying a shear transformation to at least one anatomic segment.

4. The method of claim 1, wherein the at least one attribute includes one or more elasticity attributes.

5. The method of claim 4, wherein the second imaging modality is computed tomography.

6. The method of claim 4, wherein the elasticity attributes include elasticity tensors, the method further including deriving a candidate direction of motion and a candidate warping for one of the anatomic segments based on an elasticity tensor assigned to said one anatomic segment.

7. The method of claim 4, wherein the plurality of anatomic segments includes one or more bone segments and one or more soft tissue segments, and performing the registration includes:

performing a rigid registration for at least one of the bone segments; and performing a non-rigid registration for at least one soft tissue segment based on a transformation of one of the bone segments determined by the rigid registration.

8. The method of claim 4, further including computing an elasticity tensor for one of the anatomic segments based on a known motion of said one anatomic segment.

9. The method of claim 1, wherein performing the registration generates registration data and the plurality of anatomic segments includes one or more soft tissue segments, the method further including patient-specific calibration of the registration data by:

perturbing at least one of the soft tissue segments according to a material property parameter and assigned attributes;

analyzing a response of said at least one soft tissue segment resulting from the perturbation; and setting the attribute associated with said at least one soft tissue segment based on the analysis of the response.

10. The method of claim 1, wherein the first imaging modality is a functional imaging modality and the second imaging modality is an anatomic imaging modality.

11. A non-transitory computer readable medium having instructions embodied tangibly thereupon, the instructions when executed configured to cause one or more processors to perform the operations of registering images obtained in a multi-modal medical imaging system, the operations comprising:

setting a first image as a target image and setting a second image as an object image, wherein the first and second images are obtained from first and second imaging modalities, respectively;

segmenting the object image into one or more anatomic segments, each segment associated with a respective anatomic class;

assigning at least one attribute to at least one of the anatomic segments based on the anatomic class corresponding to said at least one anatomic segment; and performing a registration with the object image and the target image, wherein the registration is constrained by the assigned at least one attribute.

12. The computer readable medium of claim 11, wherein the at least one attribute includes one or more elasticity attributes.

13. The computer readable medium of claim 12, wherein the elasticity attributes include elasticity tensors, the instructions when executed further configured to cause the one or more processors to derive a candidate direction of motion and a candidate warping for one of the anatomic segments based on an elasticity tensor assigned to said one anatomic segment.

14. The computer readable medium of claim 12, wherein the plurality of anatomic segments includes one or more bone segments and one or more soft tissue segments, and performing the registration includes:

performing a rigid registration for at least one of the bone segments; and performing a non-rigid registration for at least one soft tissue segment based on a transformation of one of the bone segments determined by the rigid registration.

15. The computer readable medium of claim 12, wherein the instructions when executed are further configured to cause the one or more processors to compute an elasticity tensor for one of the anatomic segments based on a known motion of said one anatomic segment.

16. The computer readable medium of claim 11, wherein the plurality of anatomic segments includes one or more soft tissue segments, the method further including patient-specific calibration of registration data generated by the registration, the calibration including:

perturbing at least one of the soft tissue segments according to a predetermined kinematics parameter;

analyzing a response of said at least one soft tissue segment resulting from the perturbation; and setting the attribute associated with said at least one soft tissue segment based on the analysis of the response.

17. The computer readable medium of claim 11, wherein the first imaging modality is a functional imaging modality and the second imaging modality is an anatomic imaging modality.

18. A method for registering images obtained in a multi-modal medical imaging system, the method comprising:

setting a first image as a target image and setting a second image as an object image, wherein the first and second images are obtained from first and second imaging modalities, respectively;

segmenting the object image into one or more anatomic segments;

assigning at least one attribute to at least one of the anatomic segments based on anatomic information associated with said at least one anatomic segment; and using a computer of the multi-modal medical imaging system, performing a registration with the object image and the target image, wherein the registration is constrained by the assigned attributes.

19. The method of claim 18, wherein performing the registration includes applying an elastic deformation.

20. The method of claim 18, wherein the first imaging modality is a functional imaging modality and the second imaging modality is an anatomic imaging modality.

* * * * *